June 6, 1967  J. W. RYAN  3,324,366
TUNED REED MOTORS
Filed Nov. 27, 1963  5 Sheets-Sheet 2
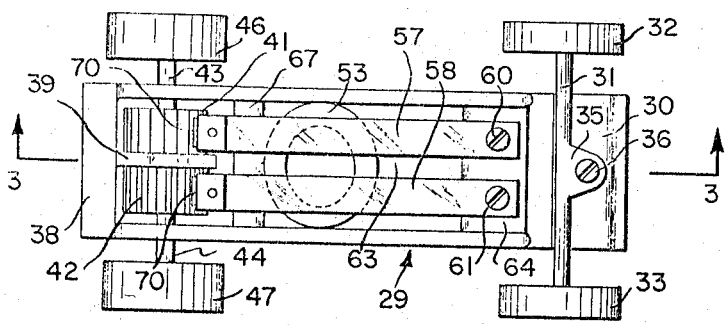
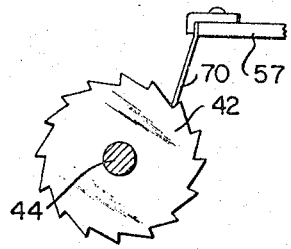
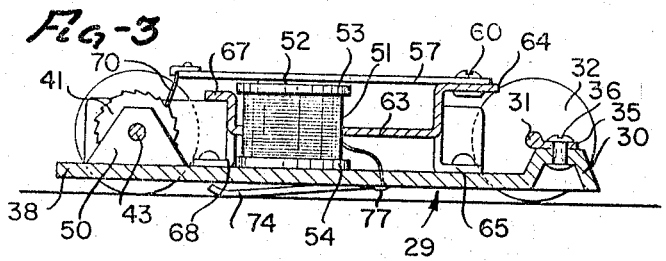
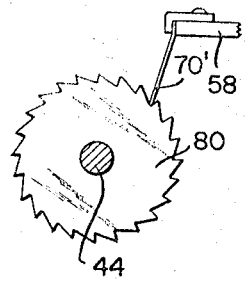
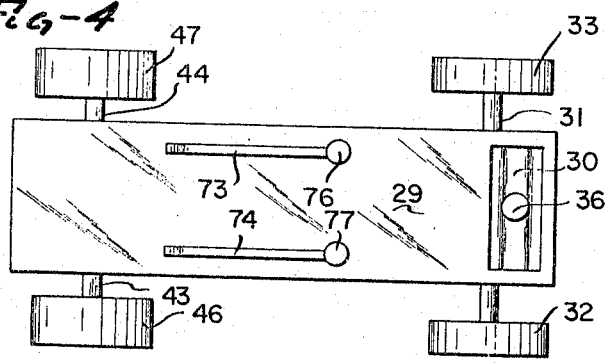
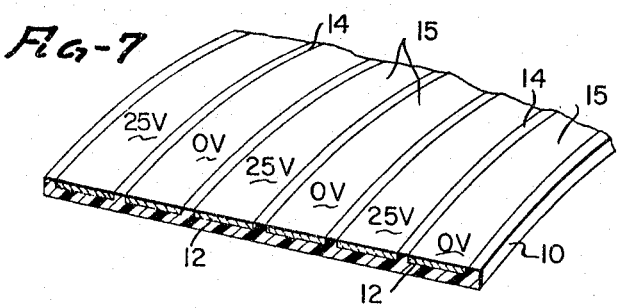
INVENTOR.
JOHN W. RYAN
BY Albert M. Herzig
ATTORNEY

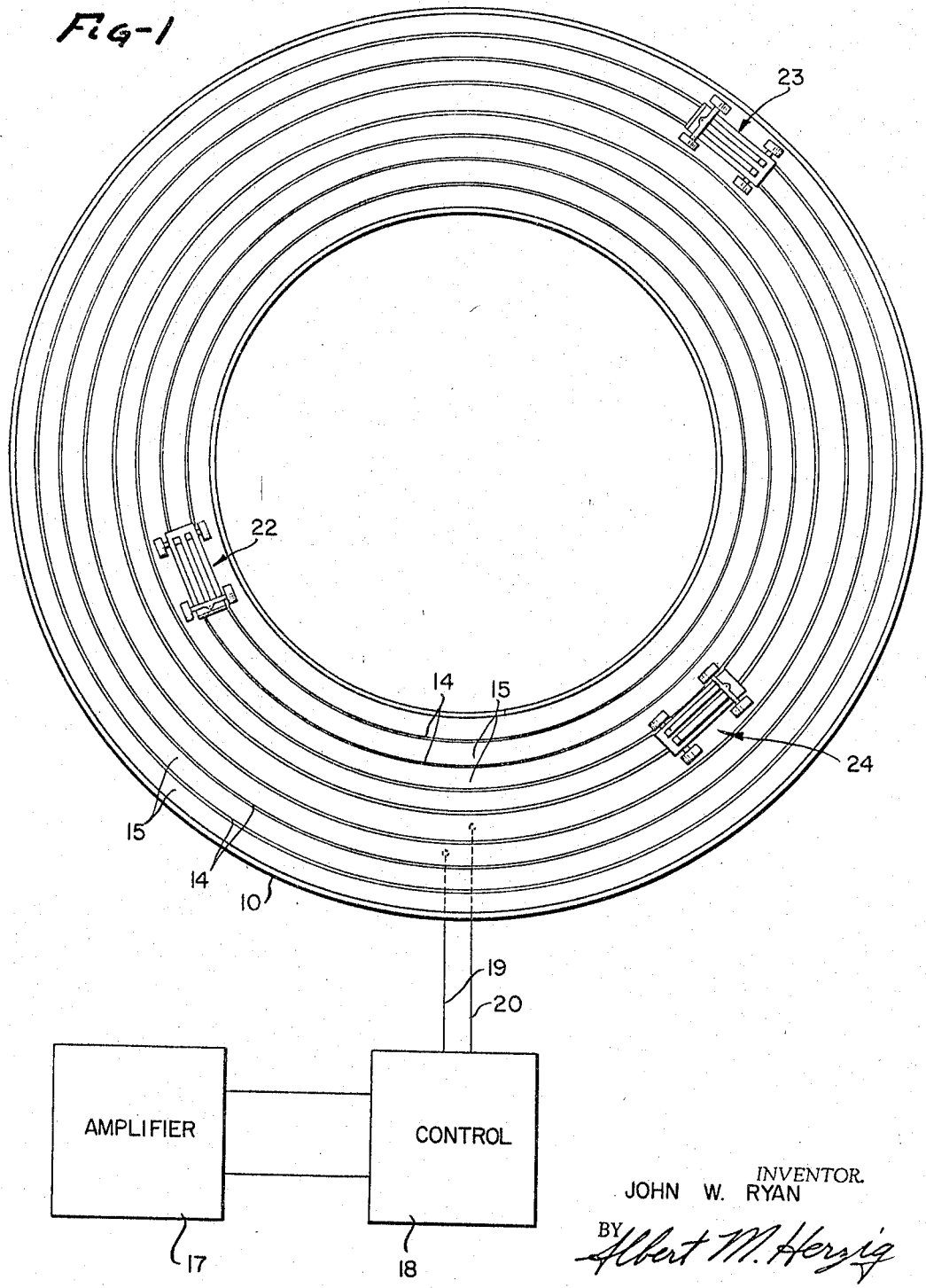

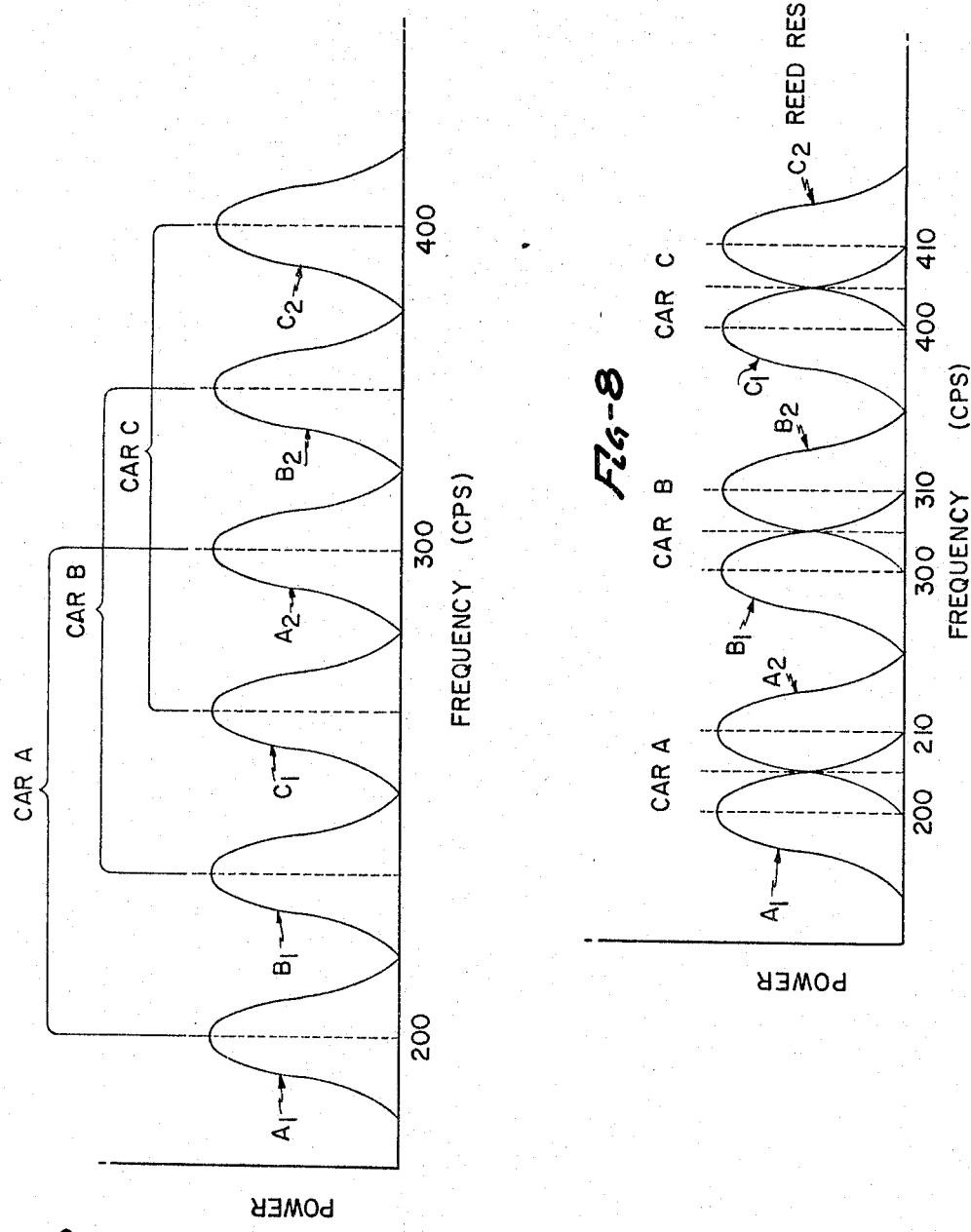

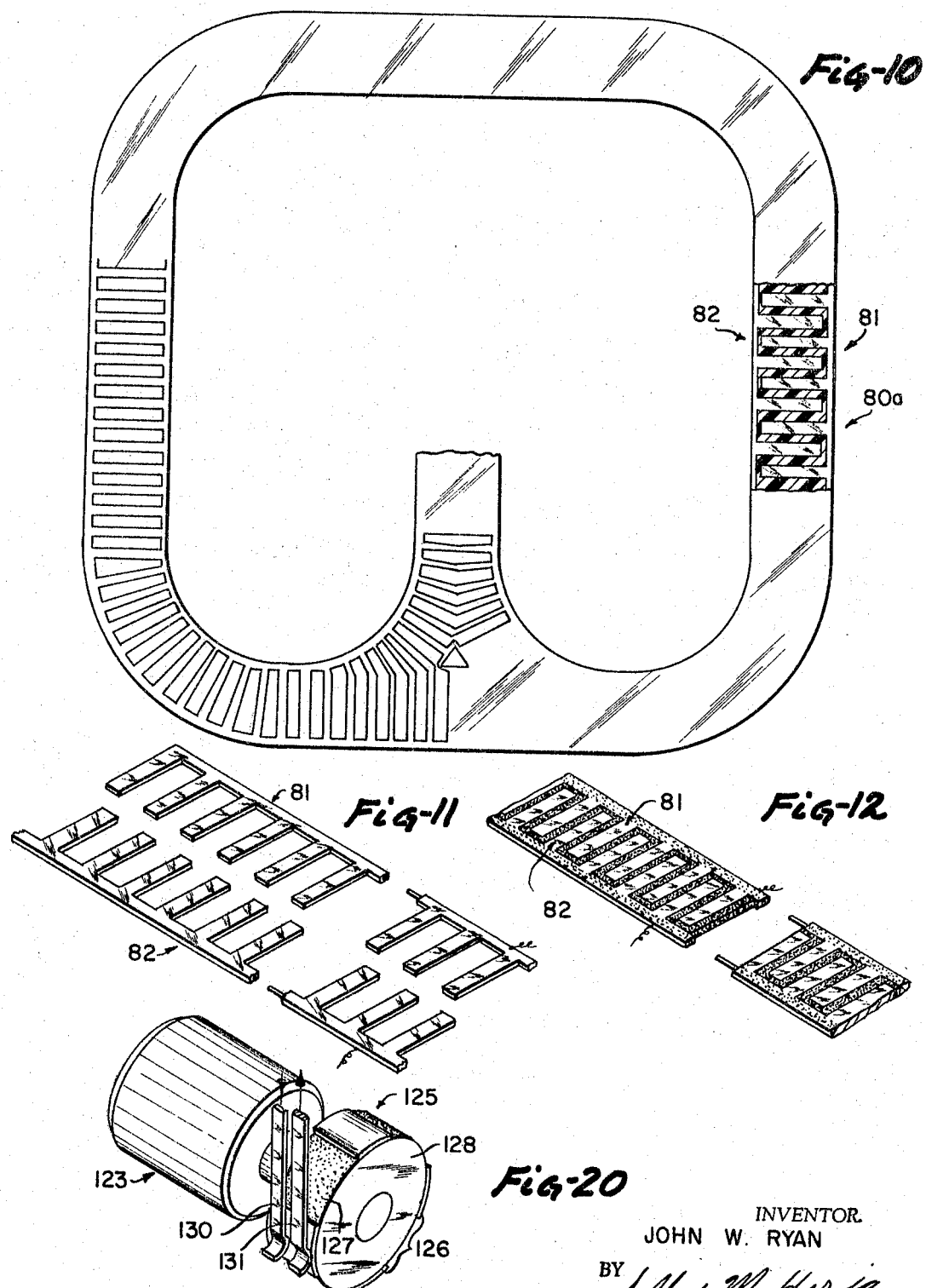

June 6, 1967 J. W. RYAN 3,324,366
TUNED REED MOTORS
Filed Nov. 27, 1963 5 Sheets-Sheet 5
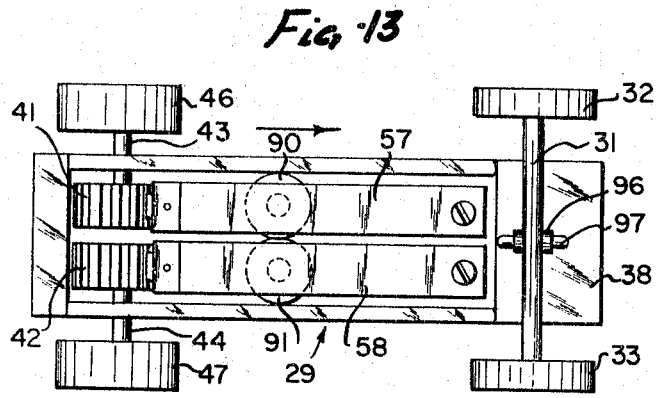
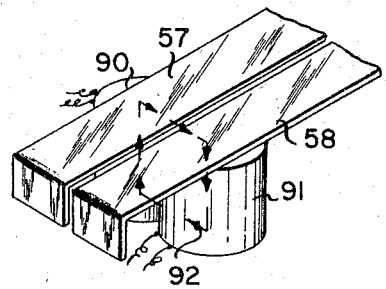
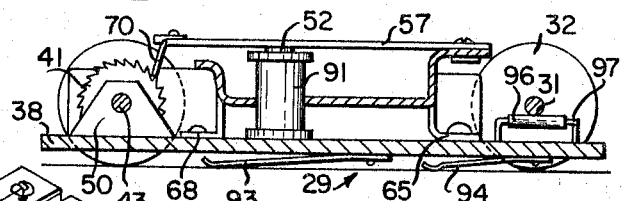
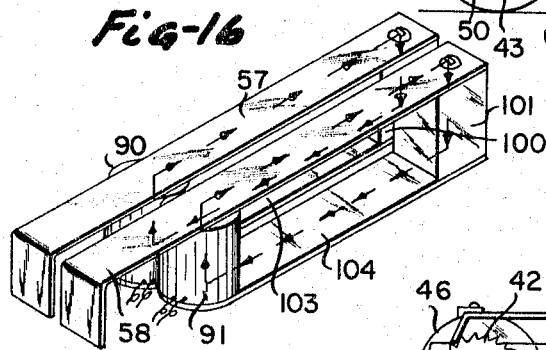
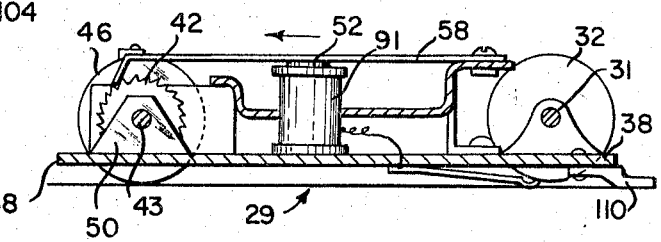
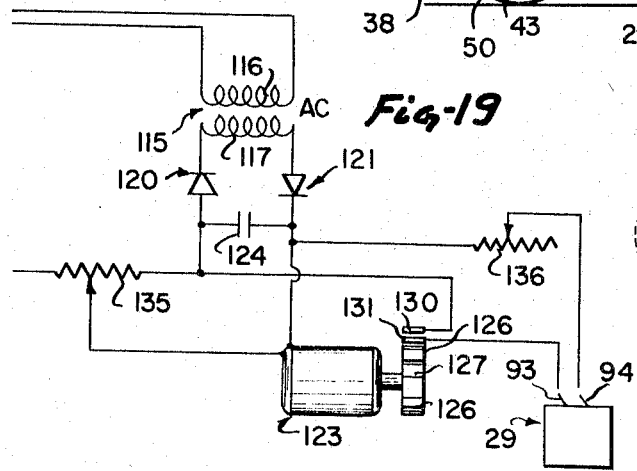
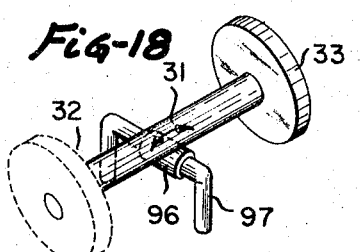
INVENTOR.
JOHN W. RYAN
BY
*Albert M. Herzig*
ATTORNEY

United States Patent Office 3,324,366
Patented June 6, 1967

3,324,366
TUNED REED MOTORS
John W. Ryan, 688 Nimes Road, Bel Air, Calif. 94558
Filed Nov. 27, 1963, Ser. No. 326,617
7 Claims. (Cl. 318—37)

This application is a continuation-in-part of previously filed application Ser. No. 297,245 filed July 24, 1963 and now abandoned.

This invention relates to devices embodying electrical motors, particularly motors of the ratchet type and means for remotely controlling the devices by change of frequency in the applied A.C. or pulsating power. This invention may have application in various embodiments. However, it is particularly adaptable in the operation and control of toy buzzer motor cars, and exemplary embodiments of the invention will be described herein as applied to such cars. In the exemplary embodiments of the invention, control of the frequency of the applied voltage is used to steer the cars and the magnitude of the voltage is utilized in part to control the speed, as will be described hereinafter.

The buzzer motor cars referred to may be miniature racing cars as small as two or three inches long which are operated on a circular or oval track. The track in one form of the invention comprises a plurality of concentric conductive rings or trackways and the motors of the cars receive current through brushes which engage the tracks. Preferably, the motor or motors are of a ratchet type embodying a ratchet wheel and reeds carrying pawls which are caused electromagnetically to vibrate to operate the ratchet wheel or wheels and to thereby drive the car. The alternating or pulsating current supplied through the brushes to a coil causes the reeds to vibrate.

In a preferred form of track transverse positively and negatively charged contact strips are provided from which power is picked up by the brushes. This arrangement has advantages as will appear in detail hereinafter.

In the invention as disclosed herein, the ratchet motor comprises a pair of reeds having different resonant frequencies operating a pair of ratchet wheels, each individually connected to a wheel of the car. The reeds are tuned, as stated, to individual resonant frequencies and a reed will respond only to the frequency range that it is tuned to and reject all others. The power developed by an individual reed depends upon whether or not it is operating at its resonant frequency, that is, whether or not the frequency applied corresponds to the resonant frequency of the reed. In this manner, steering of the car can be accomplished from a remote control point merely by control of the applied frequency. In the embodiment of the invention as described herein, the further important advantages are realized that a plurality of cars on a race track or race course can be individually controlled both as to steering and speed by remote control of the applied frequencies and voltage.

In one form of the invention, the reeds or armatures are driven by a single electromagnetic winding and in another form they are driven by dual electromagnetic windings, the flux paths being correspondingly subject to variations.

In the light of the foregoing, the primary object of the invention is to provide an improved method and means of remote control by the use of vibrating reeds tuned to individual frequencies and control of the applied frequencies and voltage.

Another object is to make possible the utilization of the foregoing principal in the remote control of motors driven by means of vibrating reeds.

Another object is to make possible the utilization of the foregoing means in the remote control of miniature race cars or other vehicles individually from a remote point, both as to steering and speed.

Another object is to provide improved track means on which to operate miniature race cars as referred to in the foregoing wherein the track is comprised of closely spaced transverse conductive strips alternately charged positively and negatively so that as the brushes pass from one strip to another there is only a very momentary dead spot between strips when the brushes pass over the insulation between them.

Another object is to provide remote frequency control means as in the foregoing wherein separate electromagnetic windings are provided for the various vibrating reeds making possible various configurations of flux paths including a configuration wherein the same flux traverses the cores of both of the electromagnetic windings.

Further objects and additional advantages of the invention will become apparent from the following detailed description and annexed drawings wherein:

FIGURE 1 is a diagrammatic view of a toy race track and cars embodying the invention therein;

FIGURE 2 is a plan view of a miniature car embodying a motor and the control means of the invention therein;

FIGURE 3 is a sectional view taken along the line 3—3 of FIGURE 2;

FIGURE 4 is a bottom view of the car of FIGURE 2;

FIGURE 5 is a detail view of a ratchet mechanism;

FIGURE 6 is a detail view of another form of ratchet mechanism;

FIGURE 7 is a partial detail view of the track showing the conductive rings or strips;

FIGURE 8 is a diagrammatic view showing graphically the relationship between power and frequency;

FIGURE 9 is a graph similar to that of FIGURE 8 showing a different relationship between resonant frequency of the reeds and the applied frequencies.

FIGURE 10 is a view of a modified form of track for the miniature cars to run on;

FIGURE 11 is a detail view of the contact strips used in the track of FIGURE 10;

FIGURE 12 is a detail view showing the construction of the track of FIGURE 10;

FIGURE 13 is a plan view of a modified form of miniature car embodying the invention;

FIGURE 14 is a perspective view of the arrangement of the vibratory reeds and electromagnetic windings of the car of FIGURE 13;

FIGURE 15 is a side elevational view of the car of FIGURE 13;

FIGURE 16 is a perspective view of a modified arrangement of windings providing for different flux paths;

FIGURE 17 is a side elevational view of a slightly modified form of the invention;

FIGURE 18 is a detail view of a preferred form of front wheel axle suspension;

FIGURE 19 is a circuit diagram illustrating the preferred manner of control of the supply of pulsating power to the motors;

FIGURE 20 is a detail view showing the commutator used in the control means of FIGURE 19;

Referring now more in detail to FIGURES 1 and 7 of the drawings, these figures show a toy race track which may take the form of a circular base 10, which may be made of plastic or other similar material. In this material are a plurality of grooves, as shown at 12, which are concentric with circular ridges 14 between them. Fitting in these grooves are circular rings or tracks made of steel as designated at 15. As will be described hereinafter alternating current voltage is applied between adjacent of the tracks or strips 15 and these tracks are engaged by brushes underneath the miniature cars so that power is picked up from the tracks. The power may be supplied from any suitable source and voltage difference between adjacent tracks may be 25 volts for example, as indicated in FIGURE 7. FIGURE 1 shows diagrammatically an amplifier 17 which may embody a suitable power source and a control component 18 whereby the magnitude of the frequency applied to the tracks may be varied as well as the voltages. FIGURE 1 shows diagrammatically connections 19 and 20 to two of the adjacent tracks. FIGURE 1 shows three of the miniature cars on it, as designated at 22, 23 and 24.

Referring to FIGURES 2, 3 and 4, these figures show the details of a preferred exemplary form of miniature car. As shown, the cars comprise a frame or chassis 29 which may be made of a suitable material having an upstanding rib or embossment 30 at the rear as shown. Numeral 31 designates a rear axle having wheels 32 and 33 on it. It has an extending tab 35 which is attached to the embossment 30 by a rivet 36.

The frame 29 has a transverse member 38 at the front which has a rearwardly extending piece 39 positioned between two ratchet wheels 41 and 42 which are on front axle members 43 and 44. On these axle members are individual front wheels 46 and 47. The front axle members 43 and 44 are journaled in upstanding frame members as shown at 50.

Mounted on the chassis 29 is an electromagnetic winding 51 which is preferably oval, as shown in FIGURE 2, so as to be adapted to cooperate with two magnetic reed armatures, as will be described. The winding 51 has a core 52 and end rings or flanges 53 and 54. The electromagnet cooperates with two magnetic reed armatures 57 and 58 which overlie the end of the winding and its core. These armatures are attached by screws as shown at 60 and 61 to the angular end part of the bracket 64, having a downwardly extending leg 65 which is secured by rivets to the chassis 29. The bracket 63 has a forwardly extending part including an angular end part 67 and a downwardly extending part 68 similarly secured to the chassis 29 by rivets, as shown. Each of the reeds 57 and 58 has an end pawl such as shown at 70, these pawls being cooperable with the ratchet wheels 41 and 42.

FIGURE 4 shows the underside of the buzzer motor. Attached to the underside are a pair of brushes 73 and 74, the ends of which are bent to suitably engage the tracks, as shown at 15. These brushes are attached to the underside of the chassis 29 by rivets as shown at 76 and 77 and they are connected to the winding 51.

FIGURE 5 shows one of the ratchet wheels and its pawl 70 in detail. FIGURE 6 shows a slightly modified form of ratchet wheel cooperable with a pawl 70′, the ratchet wheel in this figure being designated at 80 and being different only in having a different number of ratchet teeth. With this pawl, a different amount of rotational movement would be imparted to the shaft 44 because of the different number of ratchet teeth, even with a similar vibration or excursion of the reed 58. In this manner, different speeds of rotation of the front wheels may be obtained for purposes of turning, as will be described more in detail hereinafter.

A plurality of the cars as described in detail are placed on the track of FIGURE 1, as shown at 22, 23 and 24. The brushes on each car rest on adjacent tracks or conductive ring members so that the voltage is applied between the brushes of the car which engage the tracks, the adjacent tracks being insulated from each other by the rib 14 between them.

Alternating current power is applied at appropriate voltage to the adjacent trackways and is thus fed to the buzzer motors in each car. Each of the reeds of each of the cars is tuned to a different frequency and these reeds drive their respective ratchets and car wheels separately. FIGURE 8 is a graph showing the power developed relative to the applied frequencies.

In FIGURE 8, car A has reeds having resonant frequencies of A–1 and A–2. Car B has reeds having resonant frequencies of B–1 and B–2. Car C has reeds having resonant frequencies of C–1 and C–2. It will be observed that each car has reeds of different resonant frequencies and these two frequencies are spaced from the resonant frequencies of each of the other cars. It will be observed, therefore, that the response of cars B and C are in different frequency ranges than that of Car A. The current fed into the track has all of these frequencies and their corresponding voltages superimposed on it. Each car will respond only to the frequency range its reeds are tuned to, and will reject all others.

Steering of an individual car is accomplished by changing the frequency in the range to which the car responds. For example, referring to FIGURE 8, if a frequency of 205 c.p.s. is put into the track, car A's reeds will both respond with an equal conversion and the car will travel in a straight line. If a frequency of 200 c.p.s. is put into the track, car A's reed A–1 will respond to a greater power conversion than reed A–2. The result will be that reed A–1 will drive its wheel faster than wheel A–2 and the car will turn. In this manner, an individual car can be selectively turned on the race track from one pair of adjacent circular tracks to another. Speed of cars, of course, may be controlled by varying the magnitude of the voltage.

Each car has a corresponding control unit subject to steering in response to frequency variation and subject to voltage control of the speed. Any car can be individually controlled by applying frequency at or near the resonant frequencies of its respective reeds. As will be recognized, when a frequency corresponding to the resonant frequency of a reed is applied, that reed will operate with maximum power conversion or transfer to its ratchet wheel. At other frequencies, there will be a reduced power transfer and accordingly a difference in developed speed. At resonant frequencies, the more efficient power transfer between the coil and ratchet is further enhanced by reason of greater reed excursion, thus moving the ratchet further per cycle. The reed which is not in resonance with the applied voltage and frequency has a less efficient power transfer. Thus, there results a lower wheel speed from its ratchet as compared to the wheel driven by the reed operating at resonant frequency. Turning is realized in this way. If a frequency is applied which is about half way between natural resonant frequencies of two reeds of a car, both reeds will vibrate with about the same excursion and both wheels will then be driven at the same rate and the car will travel in a straight line.

As shown in FIGURES 5 and 6 as described, different speeds may also be achieved by using ratchet wheels using different numbers of teeth, as shown.

FIGURE 8 shows an arrangement in which both of the resonant frequencies of each of the cars are adjacent each other and spaced from the resonant frequencies of the other cars.

FIGURE 9 shows a variation in the arrangement in which the resonant frequencies of car A, that is A–1 and A–2, are spaced in the graph from the resonant frequencies B–1 and B–2 and C–1 and C–3 as shown. Control of steering and speed are accomplished in a similar manner with this arrangement of the resonant frequencies.

FIGURES 10, 11 and 12 show a preferred modified form of track. This track may have any desired shape as shown at 80a in FIGURE 10. In this form of track, the conducting elements whereby power is picked up for the miniature cars are arranged as closely transversely juxtaposed contact strips. With this type of track, the miniature race cars are provided with engaging brushes that may be displaced longitudinally from each other along the chassis of the car and they may or may not be displaced laterally, as will be described presently. The track 80a is made up of contact pieces such as designated at 81 and 82 which are embedded in plastic. These pieces are in the form of combs as shown, the comb 81 having teeth of extensions which interleave between the teeth of the comb 82. FIGURE 12 shows the relationship of the interleaving teeth of the combs. The contactor combs 81 and 82 are embedded in plastic so that the plastic is between the interleaving comb teeth and may cover the longitudinal parts of the combs, as shown in FIGURE 12.

The advantages of this type of track are that only two electrical connectors are necessary to charge alternate contact strips positively and negatively. Furthermore, when the brushes on the cars pass from one contact strip to another, there is only a very short momentary dead spot as the brush passes over the narrow insulation strip between the contactors. When the strips are circular, as in FIGURE 1, there may be a longer dead spot when a car passes from one set of strips to another with the brushes having an angling relationship with respect to the insulation between strips.

FIGURES 13 to 16 show a slightly modified form of miniature race car. Parts in this modification which are the same as in the previous modifications are similarly numbered. In this form of the invention, two electromagnets 90 and 91 are provided having windings and cores cooperating with the respective vibrating reeds 57 and 58 which might have resonant frequencies of 200 and 300 cycles per second, for example. The electromagnets 90 and 91 may be connected in opposition so as to produce a single flux path or configuration 92 which passes through the cores of both of the electromagnets.

In this form of the invention, the brushes are shown at 93 and 94, the brushes being spaced longitudinally along the chassis 38 and they may also be spaced laterally, if desired, but this is not necessary. As may be seen, when these brushes cooperate with a track such as shown in FIGURE 10, there are only very momentary interruptions to the flow of current when the brushes pass over the narrow transverse insulative spacings between the contact strips. The dead spots are too short in duration to effect the operation of the car.

In this form of the invention, the front wheels 32 and 33 are on a shaft or axle 31 secured to a transverse bushing 96 rotatably mounted on a yoke 97. The yoke 97 has its legs extending from the chassis 38. This allows the axle 31 to pivot about the yoke 97 so that the front wheels can accommodate themselves to rough surfaces or to minor tilting of the car so that they are always in engagement with the racetrack without either one of the wheels being lifted out of engagement with the track. This improves the capability of the device to be steered in the manner described in the foregoing, that is by causing one of the drive wheels to rotate faster than the other.

FIGURE 16 illustrates another possible configuration of the flux paths of the electromagnets 90 and 91. In this form of the invention, the vibratory reeds 57 and 58 are supported on supports 100 and 101. The windings of the electromagnets 90 and 91 are connected so that separate flux paths or configurations are provided which pass through the vibrating reeds 57 and 58, the supports 100 and 101 and bottom members 103 and 104 and the cores of the electromagnets. It has been found that with some devices this variation in the arrangement of the flux path produces improved results.

FIGURE 17 shows a slightly modified form of the invention in which the wheels 46 and 47 are the front wheels, these being the wheels that are driven. At the rear of the chassis, there is provided an intermediately positioned skid member 110 which rides on the track so that the end of the chassis 38 is lifted with the wheels 32 and 33 which are now the rear wheels lifted from the track. Thus, at one end of the car, there is a single point of contact and it has been found that this improves the capability of the car to be steered in the manner described in the foregoing by varying the relative speed of the drive wheels.

FIGURES 19 and 20 show a preferred form of circuitry for controlling the power to the cars for steering and speed control. In FIGURE 19, numeral 115 designates a transformer having a primary winding 116 and a secondary winding 117. The secondary winding is connected to rectifier elements 120 and 121 which produce an unidirectional current output which is applied to the direct-current motor 123. A filter condenser 124 is connected across the output of the diodes 120 and 121.

The motor 123 drives a commutator 125 having angularly spaced contact members 126 having insulative surfaces 127 between them (see FIGURE 20). The commutator is in the form of a cylindrical body 128 having the contactor plates 126 on its surface. Numerals 130 and 131 designate a pair of brushes which engage the commutator 125 and take off power therefrom. The brushes connect to the contactor strips of the track and the car picks up power from the track through the brushes, as described. Numeral 135 designates a steering control rheostat which controls the power to the motor 123 and accordingly its speed. This accordingly controls the rate of the pulsating output or that is the frequency thereof, whereby the cars are steered in the manner described in the foregoing by causing different vibrating reeds to vibrate at their resonant frequencies and accordingly, with an increased power output. Numeral 136 designates a rheostat in the circuit to the track whereby the amount of power delivered to the track is controlled and which thereby controls the speed of the cars.

From the foregoing, those skilled in the art will observe that the invention achieves and realizes all of the objects and advantages as stated in the foregoing as well as having many additional advantages which are apparent from the detailed description. The invention makes possible remote control of a motor driven by vibrating reeds merely by adjustment of the frequency and magnitude of the applied voltage. Remote control is accomplished in this manner and furthermore selective control between different motors is realized. As may be observed, this manner of control is ideally adapted to miniature buzzer motor cars as described operating on a racetrack formed by adjacent electrically conductive trackways from which power is supplied to the cars by brushes. Selective remote control of steering and speed is very effectively realized in the manner described and this is accomplished with simplified, effective and positive acting equipment eliminating the need for all parts other than the control of the frequency and voltage.

The foregoing disclosure is representative of preferred forms of the invention and is to be interpreted in an illustrative rather than a limiting sense, the invention to be accorded the full scope of the claims appended hereto.

I claim:

1. An electric motor comprising electromagnetic means including a pair of vibrating reed armatures; means for applying pulsating power to said electromagnetic means; said reeds having different natural resonant frequency ranges; a pair of independently rotatable rotors, each being rotatable by a respective one of said reeds whereby the speed of rotation of each rotor is dependent upon the amplitude of vibration of its associated reed; and means for selectively varying the frequency of said pulsating power to approach the natural frequency of one of said reeds while departing from the natural frequency of the other reed to thereby inversely vary the amplitudes of vibration thereof and the relative speeds of said rotors.

2. A motor as in claim 1, wherein said rotors are in the form of ratchet wheels, the vibrating reeds having pawls cooperating with the ratchet wheels.

3. A motor as in claim 1, wherein said electromagnetic means comprises a separate winding associated with each of said vibratory reed armatures.

4. An electric motor as in claim 1, associated with at least one other similar motor, and means for applying the said pulsating power to said motors, whereby control of individual rotors is realized by varying individual frequencies in ranges in which individual reeds respond.

5. An electric motor as in claim 1, including means for varying the magnitude of the voltage applied, whereby to control the relative speeds of said rotors.

6. A motor as in claim 3, wherein said windings are closely juxtaposed to each other and are connected so as to provide a single flux path which traverses the cores of both windings.

7. A motor as in claim 1, wherein said windings are closely juxtaposed and are so connected as to produce separate flux paths, one traversing the core of each of the said windings.

References Cited

UNITED STATES PATENTS

| | | | |
|---|---|---|---|
| 1,198,934 | 9/1916 | Le Grande | 310—22 |
| 1,712,377 | 5/1929 | Chirol | 318—115 |
| 1,724,825 | 8/1929 | Chirol | 310—22 |
| 1,882,428 | 10/1932 | Koenig | 310—22 |
| 2,043,744 | 6/1936 | Fuchs | 310—22 |
| 2,750,191 | 6/1956 | Denman | 273—86 |
| 2,918,589 | 12/1959 | Quenouille | 310—22 |
| 2,993,299 | 7/1961 | Dingee et al. | 46—244 |
| 3,030,526 | 4/1962 | Fuks | 307—132 |
| 3,098,940 | 7/1963 | Ruby | 310—25 X |
| 3,107,481 | 10/1963 | Oram | 310—25 X |
| 3,206,891 | 9/1965 | Adamski | 310—13 X |
| 3,209,175 | 9/1965 | Deeg | 307—132 |

MILTON O. HIRSHFIELD, *Primary Examiner.*

DELBERT B. LOWE, *Examiner.*

D. F. DUGGAN, *Assistant Examiner.*